United States Patent [19]

Tomisawa et al.

[11] Patent Number: 5,590,633
[45] Date of Patent: Jan. 7, 1997

[54] FUEL INJECTION CONTROL SYSTEM FOR ENGINE

[75] Inventors: Naoki Tomisawa; Hajime Hosoya, both of Atsugi, Japan

[73] Assignee: Unisia Jecs Corporation, Atsugi, Japan

[21] Appl. No.: 434,391

[22] Filed: May 3, 1995

[30] Foreign Application Priority Data

May 16, 1994 [JP] Japan ..................... 6-100849

[51] Int. Cl.$^6$ .................................. F02M 51/00
[52] U.S. Cl. ............................. 123/491
[58] Field of Search ................. 123/491, 492, 123/129.14, 129.16; 364/431.04, 431

[56] References Cited

U.S. PATENT DOCUMENTS 4,438,748  3/1984  Ikeura et al. ................ 123/491
4,550,373  10/1985  Ito et al. ................ 123/491

Primary Examiner—Raymond A. Nelli
Attorney, Agent, or Firm—Foley & Lardner

[57] ABSTRACT

A fuel injection control system for an internal combustion engine equipped with a fuel injection system includes fuel injector valves. The fuel injection control system comprises a control unit for controlling fuel injection for each fuel injector valve. The control unit has a function to control the fuel injection in accordance with a first characteristic required for engine starting before occurrence of an initial explosion in an engine cylinder, and in accordance with a second characteristic required for normal engine operation after occurrence of the initial explosion.

6 Claims, 4 Drawing Sheets

FUEL INJECTION CONTROL SYSTEM FOR ENGINE

BACKGROUND OF THE INVENTION

1. Field of the Invention

This invention relates to improvements in a fuel injection control system for an engine, and more particularly to a technique for improving engine starting without degrading exhaust gas characteristics.

2. Description of the Prior Art

Most internal combustion engines are equipped with a fuel injector valve(s) for injecting fuel into the engine under a fuel injection control executed by a fuel injection control system. In general, in the fuel injection control at engine starting, a larger amount of fuel is injected than in normal engine operation to improve a starting characteristics of the engine. In other words, a fuel injection control manner suitable for the engine starting is executed when a starter switch is kept turned ON on the assumption that the turning-ON state of the starter switch corresponds to an engine starting condition. This fuel injection control manner is shifted to another fuel injection control manner suitable for the normal engine operation when the starter switch is turned OFF.

However, difficulties have been encountered in the above-discussed conventional fuel injection control, as set forth below. The above fuel injection control is intended to form an air-fuel mixture necessary for causing an initial exposition in an engine cylinder, within a short period of time. Accordingly, the fuel injection control manner for the engine starting is continued even after occurrence of the initial explosion until the starter switch is turned OFF, so that the fuel injection amount within this time duration is excessive thereby degrading the characteristics of exhaust gas.

Besides, in the conventional fuel injection control in which fuel injection is intermittently made in synchronism with or in relation to engine speed during normal engine operation, such engine speed-synchronized fuel injection is made even at engine starting. However, in this control, fuel is unavoidably concentrically injected at a time since a cycle time of engine rotation is large during engine cranking at which engine speed is very low (not higher than about 200 rpm). Additionally, at such a very low engine speed, an air flow speed in the air intake passage is very low and therefore most fuel that cannot be vaporized tends to adhere to the inner wall of the air intake passage forming a fuel flow on the air intake passage inner wall.

Such a tendency is strong particularly under a low temperature condition in which fuel vaporization is degraded. Additionally, in a system having a large volume in an intake system between the fuel injector valve and the engine combustion chamber, there is a tendency for the air-fuel mixture formed to have a nonuniformity in lean and rich characteristics. As a result, a large amount of useless fuel is injected at the engine starting thereby degrading exhaust gas purifying characteristics and engine starting characteristics.

SUMMARY OF THE INVENTION

It is an object of the present invention to provide an improved fuel injection control system for an engine, by which drawbacks encountered in conventional fuel injection control systems can be effectively overcome.

Another object of the present invention is to provide an improved fuel injection control system for an engine, which can improve engine starting characteristics of the engine while improving exhaust gas characteristics.

A further object of the present invention is to provide an improved fuel injection control system for an engine, by which a fuel injection control manner suitable for engine starting can be appropriately shifted to another fuel injection control manner suitable for normal engine operation.

A still further object of the present invention is to provide an improved fuel injection control system for an engine, by which the shift from a fuel injection control manner suitable for engine starting to another fuel injection control manner suitable for normal engine operation is effectively accomplished in response to occurrence of an initial explosion in the engine.

A fuel injection control system according to the present invention is for an engine and, as shown in FIG. 1, comprises fuel injection means 1A for injecting fuel into an intake system of the engine. Initial explosion detecting means 1B is provided to detect an initial explosion in the engine. Starting control means 1C is provided to control fuel injection by the fuel injection means within a time period between initiation of engine cranking at engine starting and occurrence of the initial explosion detected by the initial explosion. Additionally, normal operation control means 1D is provided to control fuel injection by the fuel injection means after the occurrence of the initial explosion.

According to this arrangement, a fuel injection control manner required for engine starting is accomplished during the time period from the initiation of engine cranking to the occurrence of the initial explosion in the engine cylinder. When the initial explosion occurs, the above fuel injection control shifts to another fuel injection control manner required for the normal engine operation. Therefore, the above fuel injection control required for engine starting is prevented from continuing after the occurrence of the initial exposition, thus avoiding degradation of exhaust gas characteristics.

DETAILED DESCRIPTION OF THE INVENTION

Figure 2:
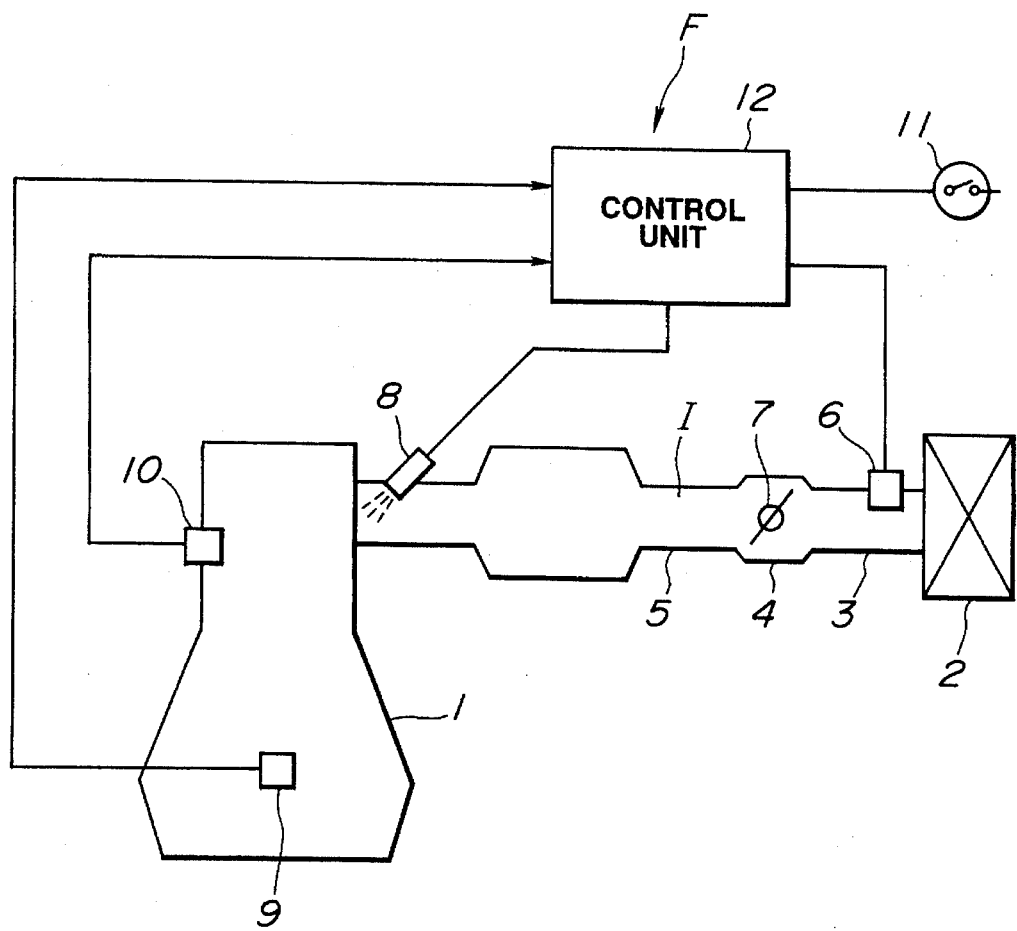
FIG. 2 is a schematic illustration of an embodiment of a fuel injection control system according to the present invention, associated with an internal combustion engine.

Referring now to FIG. 2, an embodiment of a fuel injection control system for an internal combustion engine 1 according to the present invention is illustrated by the reference character F. The engine 1 in this embodiment is for an automotive vehicle though not shown. The engine 1 is provided with an intake system (not identified) including an air intake passage I through which intake air is supplied to engine cylinders (not shown) of the engine 1. The air intake passage I is formed through an air cleaner 2, an air intake duct 3, a throttle chamber 4 and an intake manifold 5 having a plurality of branch runners connected respectively to the engine cylinders.

An air flow meter 6 is disposed in the air intake duct 3 to detect a flow rate Qa of intake air. A throttle valve 7 is disposed in the throttle chamber 4 and arranged to be operated in relation to an acceleration pedal (no shown) to control the intake air flow amount Qa. A fuel injector valve 8 is disposed in each branch runner of the intake manifold 5 and arranged to inject fuel supplied under pressure from a fuel pump (not shown) and controlled by a pressure regulator (not shown) to have a predetermined pressure.

Figure 3:
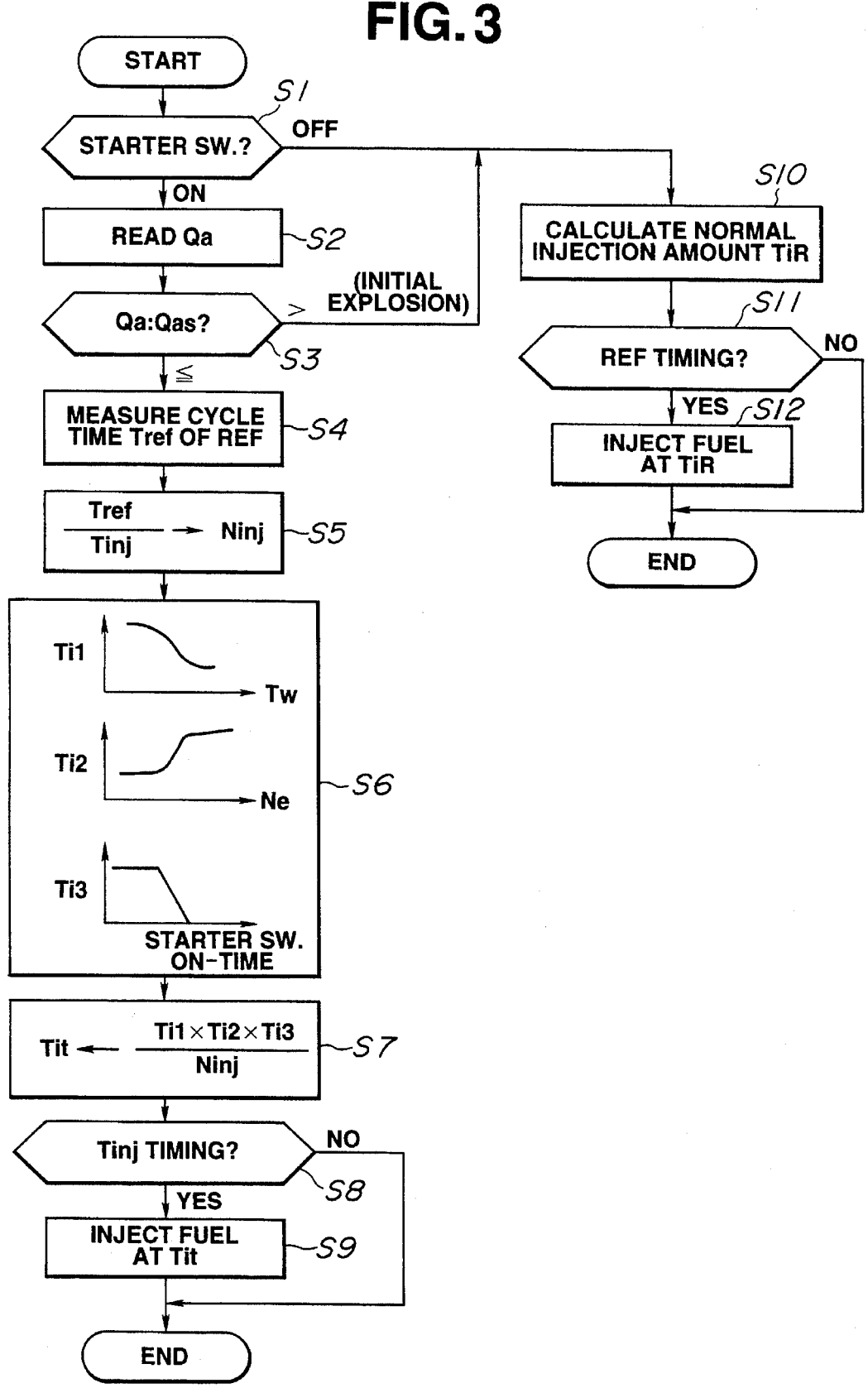
FIG. 3 is a flowchart of a fuel injection-control routine used in the fuel injection control system of FIG. 2.

A crankangle sensor 9 is provided to output a standard angle signal REF at intervals of a crankangle (180° in a four-cylinder engine) corresponding to the phase difference in an engine stroke among the engine cylinders. An engine coolant temperature sensor 10 is provided to detect the temperature Tw of an engine coolant and produce a signal representative of the engine coolant temperature Tw. Additionally, a starter switch 11 is provided to operate an engine starter (not shown), which cranks the engine 10. The starter switch 11 is adapted to produce a signal representing that starter switch is turned ON. The signals from the crankangle sensor 9, the engine coolant temperature sensor 10 and the starter switch 11 are input to a control unit 12 arranged to accomplish a fuel injection control as shown in the flowchart of FIG. 3.

A manner of the fuel injection control by the fuel injection control system F will be discussed with reference to the flowchart of FIG. 3.

At a step S1, a judgment is made as to whether the starter switch 11 is turned ON or OFF. When the starter switch 11 has been turned ON representing the fact that the engine 1 is under engine cranking, a flow goes to a step S2. At the step S2, the intake air flow rate Qa detected by the air flow meter 6 is read.

Figure 4:
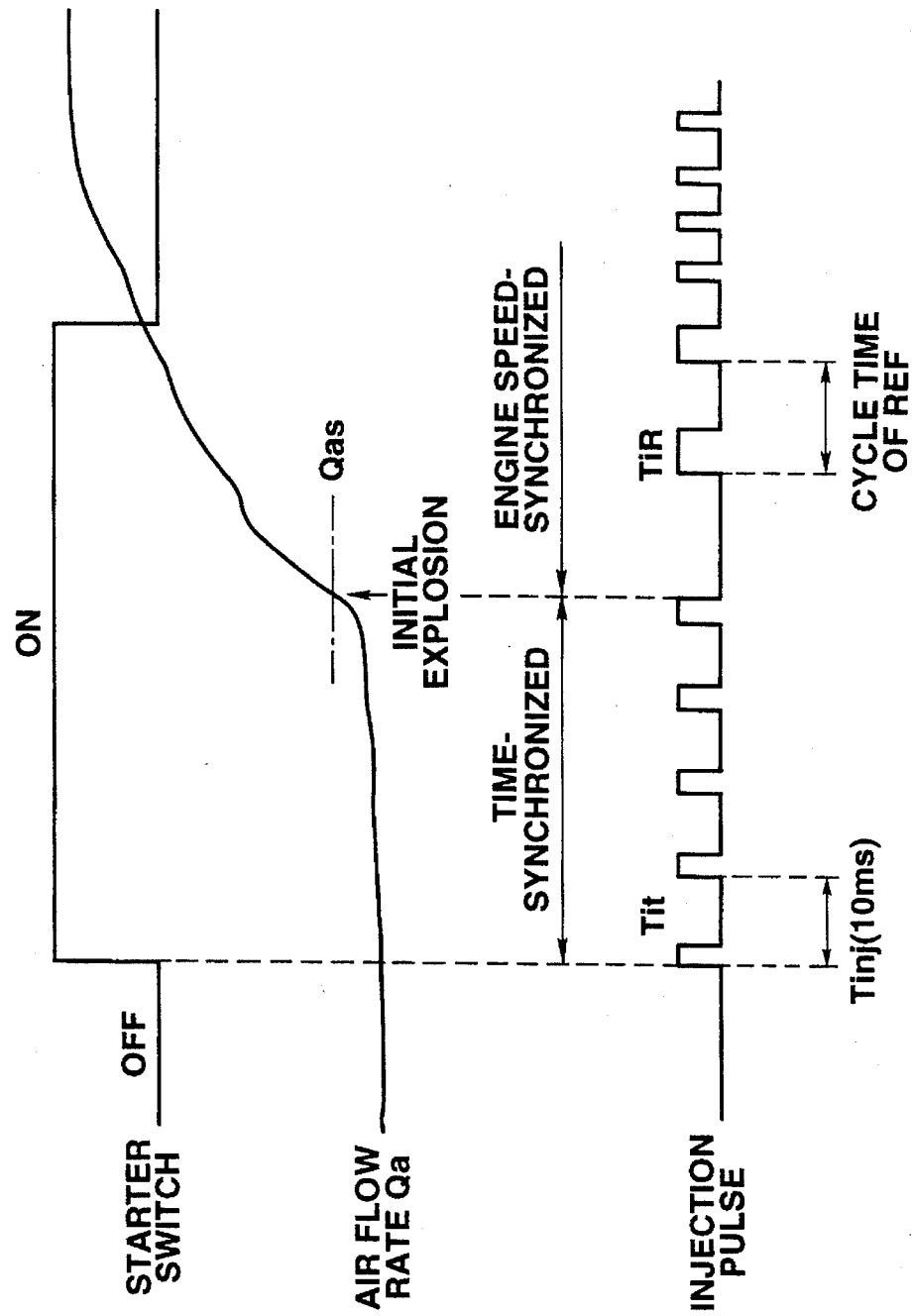
FIG. 4 is a time chart showing the characteristics of a fuel injection control by the fuel injection control system of FIG. 2.

At a step S3, a judgment is made as to whether the read intake air flow rate Qa exceeds a predetermined value Qas or not. The predetermined value Qas has been preset so that the intake air flow rate Qa exceeds the value Qas for the first time when an initial explosion occurs in one of the engine cylinders. The initial explosion is the first explosion of air-fuel mixture in the cylinder after the starter switch 11 is turned ON. The air-fuel mixture is formed by mixing intake air in the intake air passage I and fuel injected from the fuel injector valve 8. As shown in FIG. 4, when the initial explosion occurs during the engine cranking, the intake air flow rate Qa abruptly increases. Accordingly, in this embodiment, it is judged that the initial explosion has occurred, by detecting the fact that the intake air flow rate Qa exceeds the predetermined value Qas. Thus, the initial explosion can be easily detected with a high accuracy.

While the initial explosion has been shown and described as being judged to have occurred in accordance with the intake air flow rate Qa, it will be understood that the occurrence of the initial explosion may be judged by detecting the fact that the increasing rate of change of intake air flow rate exceeds a predetermined value. Additionally, the occurrence of the initial explosion may be judged by detecting an abrupt increasing change of a pressure (boost pressure) in the intake air passage I or a pressure within the engine cylinder, in accordance with the absolute level or the rate of change of the pressure.

In case that the judgment result at the step S3 represents that the intake air flow rate Qa is not higher than Qas (i.e., the initial explosion has not yet been occurred), the flow goes to a step S4 thereby accomplishing a fuel injection control for engine starting.

At the step S4, a cycle time Tref of the standard angle signal REF output from the crankangle sensor 9 is measured.

At a step S5, the cycle time Tref of the standard angle signal REF measured at the step S4 is divided by a predetermined injection interval time Tinj (for example, 10 ms) to obtain the frequency Ninj of fuel injection made at the injection interval time Tinj within the above-mentioned cycle time Tref. Meant by the "injection interval time" is a cycle time of fuel injection within a time duration from the initiation of engine cranking to occurrence of the initial explosion, as discussed below. It is to be noted that a time-synchronized fuel injection is carried out with the abovementioned time duration, the time-synchronized fuel injection means a manner of fuel injection from the fuel injector valve 8 in synchronism with or in relation to time.

At a step S6, a basic fuel injection amount Ti1 required for the engine starting is calculated, in accordance with the engine coolant temperature Tw. Additionally, correction values Ti2, Ti3 for correcting the basic fuel injection amount Ti1 are calculated respectively in accordance with engine speed Ne (of the engine 1) and an ON-continuing time (a continuous time for which the switch 11 is kept turned ON) of the starter switch 11. The values Ti1, Ti2, Ti3 have been previously set on the premise that fuel injection from the fuel injector 8 is made in synchronism with or in relation to engine speed and whenever the standard angle signal REF is produced, so that the values are calculated according to a calculation manner for the fuel injection during the engine starting in synchronism with or in relation to engine speed.

At a step S7, a calculation of Ti1×Ti2×Ti3 is made to obtain a corrected fuel injection amount for the case that fuel injection is made in synchronism with or in relation to engine speed and whenever the standard angle signal REF is produced. Additionally, the corrected fuel injection amount for the engine starting is divided by the above-mentioned fuel injection frequency Ninj to obtain a fuel injection amount Tit (an amount of fuel to be injected at each injection of the fuel injector 8). Thus, the corrected fuel injection amount is uniformly divided into a plurality of small fuel injection amounts each of which corresponds to the fuel injection amount Tit.

At a step S8, a time-synchronized fuel injection timing at the intervals of the injection interval time Tinj (for example, 10 ms) is counted. When the fuel injection timing comes, the flow goes to a step S9 at which fuel injection from the fuel injector valve 8 is made thereby accomplishing a fuel injection every injection interval time Tinj and in synchronism with or in relation to time, as shown in FIG. 4. In FIG. 4, each "injection pulse" is output from the control unit 12 and represents the timing of each fuel injection from the fuel injector valve 8. The injection pulse has a pulse width corresponding to the fuel injection amount Tit, TiR.

Thus, according to this embodiment, fuel to be injected at one injection is uniformly divided into a plurality of segments each of which is injected at each fuel interval time Tinj, so that each fuel segment is injected at each injection of the fuel injector valve 8. As a result, fuel supply can be prevented from upon being temporarily concentrated due to a long cycle time of fuel injection during the engine cranking at which the engine speed is low, while suppressing production of non-uniform or lean and rich air-fuel mixtures.

Furthermore, according to this embodiment, during the engine cranking, fuel is injected in the manner of the time-synchronized fuel injection upon uniformly dividing the fuel injection amount matched with a manner of the engine speed-synchronized fuel injection in which the fuel injection is made every standard angle signal REF. The "engine speed-synchronized fuel injection" means a fuel injection in synchronism with or in relation to the engine speed. Therefore, a shift from the engine speed-synchronized manner to the time-synchronized manner is readily carried out thereby making possible to inject an appropriate amount of fuel in the time-synchronized manner.

In case that the initial explosion is detected in accordance with the intake air flow rate Qa at the step S3, the flow goes to a step S10 at which the fuel injection control (time-synchronized) for the engine starting shifts to a fuel injection control for normal engine operation, as illustrated in FIG. 4. Accordingly, the fuel injection control for the engine starting is discontinued, and therefore a larger amount of fuel injection (calculated at the step 6) is prevented from being made at the fuel even though the starter switch 11 is kept turned ON after occurrence of the initial explosion as shown in FIG. 4, thus avoiding degradation of the characteristics of exhaust gas from the engine.

At the step S10, the basic fuel injection amount Tp is calculated in accordance with an intake air flow rate Qa detected by the air flow meter 6 and an engine speed Ne calculated according to the standard angle signal REF from the crankangle sensor 9. Additionally, the basic fuel injection amount Tp is corrected with engine operating conditions such as the coolant temperature Tw and the like thereby to obtain a final or corrected fuel injection amount TiR.

At a step S11, output of the standard angle signal REF from the crankangle sensor 9 is detected. In response to the standard angle signal REF, the flow goes to a step S12 at which fuel is injected at the fuel injection amount TiR from the fuel injector 8 in synchronism with or in relation to engine speed whenever the standard angle signal REF is output.

Figure 1:
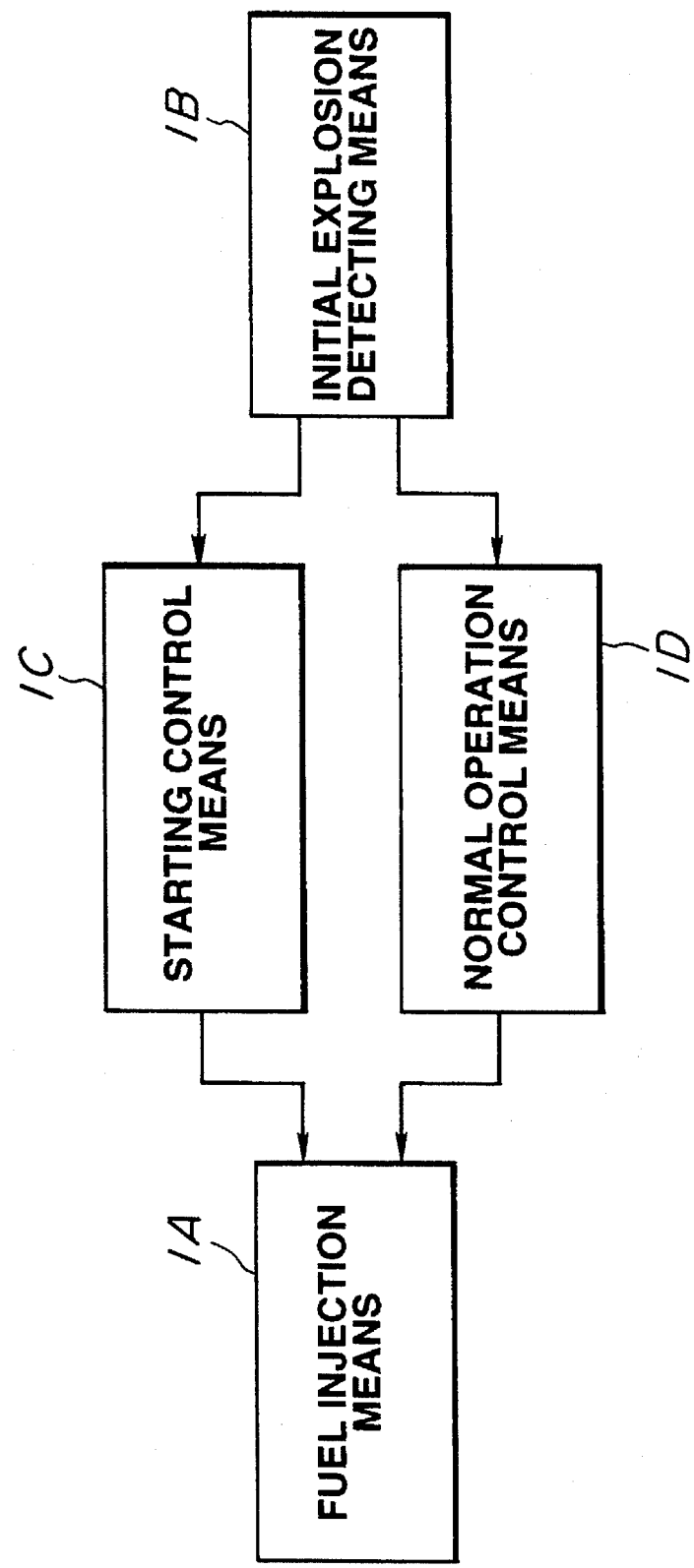
FIG. 1 is a block diagram showing the principle of the present invention.

It will be understood that, in this embodiment, the initial explosion detecting means 1B, the starting control means 1C and the normal operation control means 1D in FIG. 1 form part of the control unit 12 and includes a predetermined software.

While fuel injector valves 8 have been shown and described as being disposed respectively for engine cylinders, it will be appreciated that a common single fuel injector valve may be disposed in a collector section of the intake manifold. Additionally, the injection interval time Tinj may not be fixed and therefore may be changed according to a temperature condition and the like during the engine starting.

What is claimed is:

1. A fuel injection control system for an engine, comprising:

fuel injection means for injecting fuel into an intake system of the engine;

initial explosion detecting means for detecting an initial explosion in the engine based on at least one of an intake air flow rate, a pressure within an intake air passage;

and a pressure within an engine cylinder;

starting control means for controlling fuel injection by said fuel injection means within a time period between initiation of engine cranking at engine starting and occurrence of the initial explosion detected by said initial explosion detecting means; and normal operation control means for controlling fuel injection by said fuel injection means after the occurrence of the initial explosion.

2. A fuel injection control system as claimed in claim 1, wherein said starting control means includes means for controlling the fuel injection in accordance with a first characteristic suitable for engine starting when operated, wherein said normal operation control means includes means for controlling the fuel injection in accordance with a second characteristic suitable for a normal engine operation when operated.

3. A fuel injection control system as claimed in claim 2, further comprising means for operating said starting control means and said normal operation control means in response to the occurrence of the initial explosion detected by said initial exposition detecting means, said operating means including means for operating said fuel injection controlling means of said starting control means before the occurrence of the initial explosion, and means for operating said fuel injection controlling means of said normal operation control means after the occurrence of the initial explosion.

4. A fuel injection control system as claimed in claim 1, wherein said starting control means includes means for controlling the fuel injection in synchronism with time, wherein said normal operation control means includes means for controlling the fuel injection in synchronism with engine speed of the engine.

5. A fuel injection control system as claimed in claim 4, wherein said fuel injection control means of said starting control means includes means for causing said fuel injection means to inject fuel at intervals of a predetermined time.

6. A fuel injection control system as claimed in claim 4, wherein said fuel injection control means of said starting control means includes means for causing said fuel injection means to inject fuel in a manner to divide an amount of fuel to be injected in synchronism with time during the normal engine operation, into a plurality of segments which are to be injected respectively at intervals of a predetermined time.

* * * * *